(12) United States Patent
Uenosono et al.

(10) Patent No.: US 10,355,391 B2
(45) Date of Patent: Jul. 16, 2019

(54) CONNECTOR

(71) Applicant: Yazaki Corporation, Tokyo (JP)

(72) Inventors: Daisuke Uenosono, Kakegawa (JP);
Takashi Tsukamoto, Kakegawa (JP);
Shoya Ueda, Fujieda (JP); Naoto Sugie, Kakegawa (JP); Koutatsu Shibayama, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/646,754

(22) Filed: Jul. 11, 2017

(65) Prior Publication Data

US 2018/0019535 A1 Jan. 18, 2018

(30) Foreign Application Priority Data

Jul. 13, 2016 (JP) .................................. 2016-138796

(51) Int. Cl.
| | |
|---|---|
| *H01R 13/52* | (2006.01) |
| *H01R 13/58* | (2006.01) |
| *H01R 13/73* | (2006.01) |
| *H01R 24/30* | (2011.01) |
| *H01R 13/422* | (2006.01) |
| *H01R 13/426* | (2006.01) |

(Continued)

(52) U.S. Cl.
CPC ....... *H01R 13/5025* (2013.01); *H01R 13/426* (2013.01); *H01R 13/4223* (2013.01); *H01R 13/4367* (2013.01); *H01R 13/506* (2013.01); *H01R 13/5221* (2013.01); *H01R 13/5837* (2013.01); *H01R 13/73* (2013.01); *H01R 24/30* (2013.01); *H01R 2201/26* (2013.01)

(58) Field of Classification Search
CPC .............. H01R 13/582; H01R 13/6683; H01R 13/5052; H01R 13/426; H01R 13/4367; H01R 13/5221; H01R 13/5837; H01R 13/73; H01R 24/30; H01R 2201/25
USPC ......................................................... 439/603
See application file for complete search history.

(56) References Cited

U.S. PATENT DOCUMENTS

| | | | | |
|---|---|---|---|---|
| 5,679,019 A | * | 10/1997 | Sakai ................. | H01R 13/5208 439/271 |
| 5,800,195 A | * | 9/1998 | Endo .................. | H01R 13/5221 439/271 |

(Continued)

FOREIGN PATENT DOCUMENTS

| | | |
|---|---|---|
| CN | 103794922 A | 5/2014 |
| JP | 2015-8099 A | 1/2015 |

OTHER PUBLICATIONS

Communication dated Jul. 10, 2018, issued by the Japanese Patent Office in counterpart Japanese Application No. 2016-138796.

(Continued)

*Primary Examiner* — Edwin A. Leon
*Assistant Examiner* — Matthew T Dzierzynski
(74) *Attorney, Agent, or Firm* — Sughrue Mion, PLLC (57) ABSTRACT

A connector includes a housing that has a plurality of terminal receiving chambers into which terminals are inserted and a rear holder that is mounted at the housing and supports a wire connected to the terminal received in each terminal receiving chamber. In the connector, the rear holder has a terminal holding part that holds each terminal at a predetermined position in an insertion direction of the rear holder into each terminal receiving chamber.

4 Claims, 7 Drawing Sheets

(51) Int. Cl.
*H01R 13/436* (2006.01)
*H01R 13/502* (2006.01)
*H01R 13/506* (2006.01)

(56) References Cited

U.S. PATENT DOCUMENTS

| | | | | |
|---|---|---|---|---|
| 6,764,351 B2* | 7/2004 | Finzer | ............... | F16B 29/00 |
| | | | | 439/752 |
| 6,910,920 B2* | 6/2005 | Su | ............... | H01R 13/4223 |
| | | | | 439/106 |
| 6,971,924 B2* | 12/2005 | Fujita | ............... | H01R 13/516 |
| | | | | 439/701 |
| 8,241,062 B2* | 8/2012 | Tsuruta | ............... | H01R 9/032 |
| | | | | 439/352 |
| 8,747,157 B2* | 6/2014 | Tashiro | ............... | H01R 13/4364 |
| | | | | 439/246 |
| 9,373,918 B2* | 6/2016 | Kawai | ............... | H01R 13/6683 |
| 9,608,353 B1* | 3/2017 | Ang | ............... | H01R 13/4367 |
| 2001/0019922 A1* | 9/2001 | Fuehrer | ............... | H01R 13/4364 |
| | | | | 439/752 |
| 2012/0231644 A1* | 9/2012 | Kinoshita | ............... | H01R 13/111 |
| | | | | 439/205 |
| 2012/0295460 A1* | 11/2012 | Ichio | ............... | H01R 13/5208 |
| | | | | 439/205 |
| 2014/0113479 A1* | 4/2014 | Yoon | ............... | H01R 13/4367 |
| | | | | 439/372 |
| 2016/0126681 A1 | 5/2016 | Kawai et al. | | |

OTHER PUBLICATIONS

Communication dated May 21, 2018, issued by the Korean Intellectual Property Office in counterpart Korean application No. 10-2017-0088289.
Communication dated Sep. 29, 2018, issued by the China National Intellectual Property Administration in counterpart Chinese Application No. 201710569588.6.
Communication dated Apr. 3, 2019 issued by the State Intellectual Property Office of P.R. China in counterpart Chinese Application No. 201710569588.6.

* cited by examiner

CONNECTOR

CROSS REFERENCE TO RELATED APPLICATION

This application is based on Japanese Patent Application No. 2016-138796 filed on Jul. 13, 2016, the contents of which are incorporated herein by reference.

BACKGROUND OF THE INVENTION

1. Technical Field

The present invention relates to a connector.

2. Background Art

There has been known a connector including a holder (a rear holder) assembled to a housing to support wires connected to terminals received in the housing (see JP-A-2015-008099 and the like). The holder has a first holder including a locking part and a second holder that interposes the wires with the first holder when a locked part is locked to the locking part.

Figure 6:
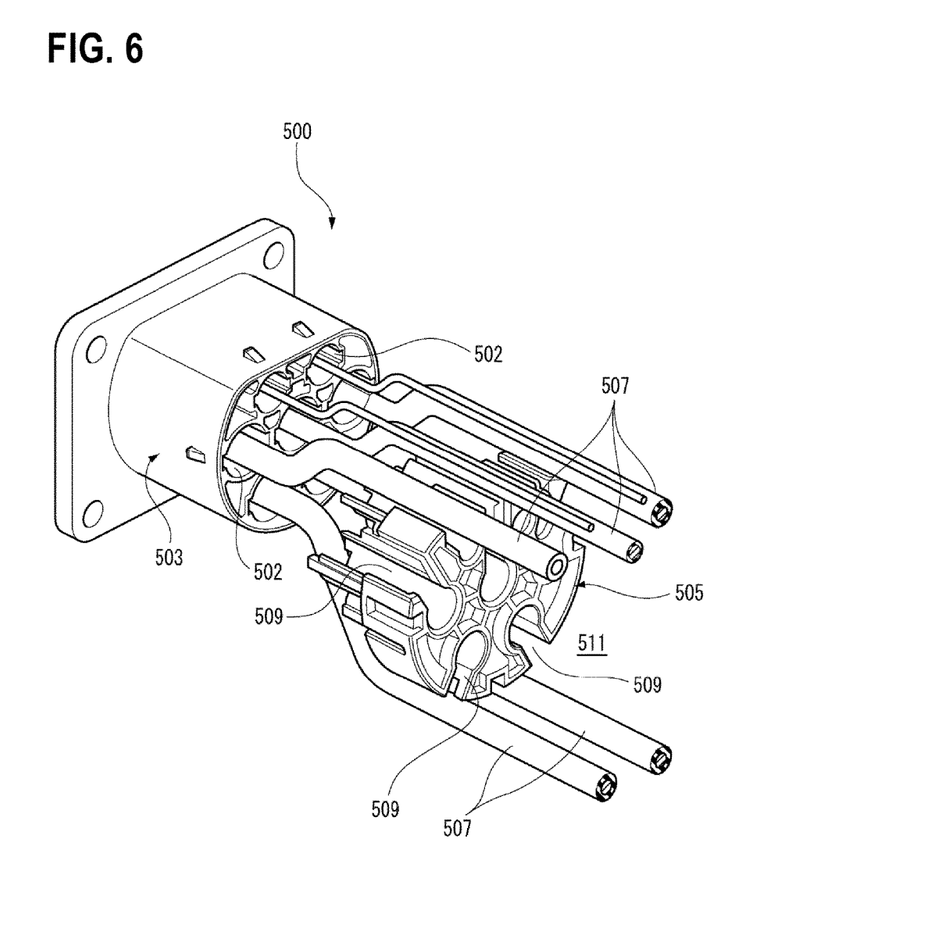
FIG. 6 is a perspective view from the rear end surface side of the housing before a rear holder with the set terminal is inserted thereinto in a connector of the related art.

A connector 500 illustrated in FIG. 6 has a housing 503 that receives terminals 501, and a rear holder 505 mounted at a rear end of the housing 503 to hold the terminals 501 with the housing 503. The rear holder 505 is formed with a slit 509 for setting wires 507 connected to the terminals 501.

When assembling the connector 500, the plurality of terminals 501 are first inserted into terminal receiving chambers 502 of the housing 503.

Next, the plurality of wires 507 are vertically drawn to make a space 511. Then, the rear holder 505 passes through the space 511. The wires 507 are set in the slit 509 of the rear holder 505.

Figure 7:
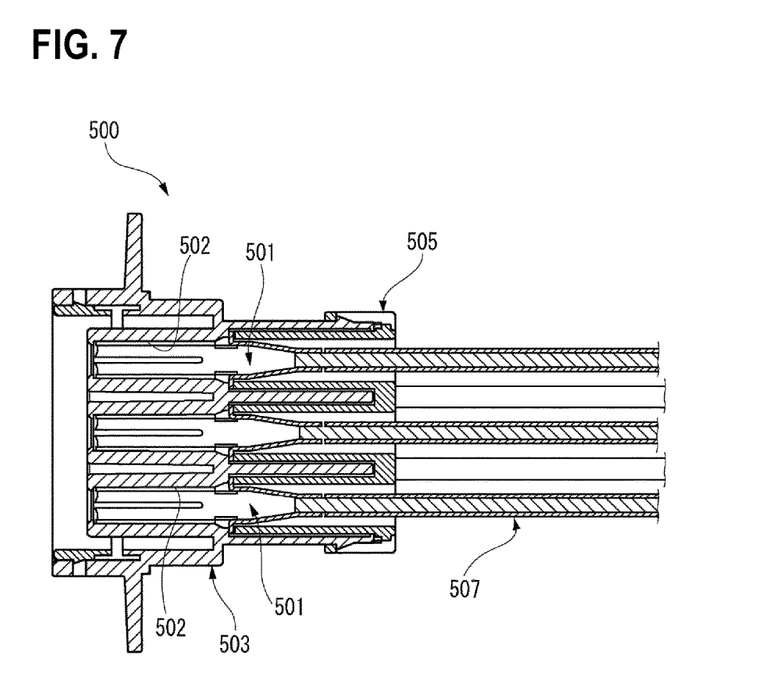
FIG. 7 is a horizontal sectional view of the connector illustrated in FIG. 6.

Finally, as illustrated in FIG. 7, the rear holder 505 is mounted at the rear end of the housing 503 and the terminals 501 are retained by the rear holder 505, so that the connector 500 is completely assembled.

However, in the aforementioned connector disclosed in JP-A-2015-8099, since the holder mounted at the housing to support the wires connected to the terminals is divided into the first holder and the second holder, the structure is complicated. Therefore, there is a problem that assembling workability is not good.

Furthermore, in the connector 500 illustrated in FIGS. 6 and 7, since the procedure when the rear holder 505 for retaining the terminals 501 is assembled to the housing 503 is complicated and the wires 507 are tangled, it becomes a difficult work. Furthermore, until the rear holder 505 is mounted at the housing 503, since it is not possible to retain the terminals 501 to the housing 503 it is probable that the terminals 501 will depart from normal positions. In the state in which the terminals 501 depart from the normal positions, when the rear holder 505 is assembled, since it is not possible to obtain terminal holding power, assembling failure may occur.

The present invention has been made to solve the above-described problem, and an object of the present invention is to provide a connector capable of improving assembling workability and suppressing assembling failure.

SUMMARY OF INVENTION

The aforementioned object of the present invention is achieved by the following configurations.

(1) A connector includes:
a housing that has a plurality of terminal receiving chambers into which terminals are inserted; and
a rear holder that is mounted at the housing and supports a wire connected to the terminal received in each terminal receiving chamber,
wherein the rear holder has a terminal holding part that holds each terminal at a predetermined position in an insertion direction of the rear holder into each terminal receiving chamber.

According to the connector of the aforementioned configuration (1), before the rear holder is mounted at the housing, the terminals can be assembled to the rear holder. By so doing, in the state in which the terminal holding parts hold the terminals, the rear holder can be mounted at the housing, so that assembling workability is improved. Furthermore, the holding state of the terminals with respect to the terminal holding parts is visible, so that assembling failure is easily suppressed.

(2) In the connector of (1), the terminal holding part includes:
a plurality of flexible pieces which is inserted and fitted to the terminal receiving chambers;
front locking portions which are thrilled at distal end portions of the flexible pieces and engaged with the terminals to restrain the terminals in a terminal insertion direction; and
rear locking portions which are formed at base sides of the flexible pieces compared to the front locking portions and engaged with the terminals to retain and lock the terminals with respect to the rear holder.

According to the connector of the aforementioned configuration (2), the terminal holding part of the rear holder is configured by the flexible piece provided at the distal end side thereof with the front locking portion and the rear locking portion. The front locking portion restrains the terminal insertion direction positions of the terminals. The rear locking portion is engaged with the terminals to restrain the terminals from coming out from the rear side of the rear holder. The terminals mounted at the ends of the wires are inserted into the rear holder in the same direction as the mounting direction of the rear holder. The flexible pieces in the terminal holding parts are bent, so that the terminals inserted into the rear holder climb over the rear locking portions of the flexible pieces, and then their terminal insertion direction positions are restrained by the front locking portions and thus the terminals are stopped. The terminal insertion direction positrons of the terminals are decided by the front locking portions and simultaneously the flexible pieces are elastically returned, so that coming-out of the terminal from the rear side of the rear holder is restrained by the rear locking portions. That is, the terminals are inseparably mounted in the rear holder. Then, the rear holder mounted with the terminals is mounted at the housing. Accordingly, the terminals are assembled to the housing via the rear holder. In the connector having the present configuration, the terminal holding part can be easily and integrally formed with the rear holder by the flexible piece having the front locking portion and the rear locking portion.

(3) In the connector of (2), the rear locking portion is formed with a tapered surface inclined toward an inner surface of the flexible piece, at a rear side of the rear holder.

According to the connector of the aforementioned configuration (3), when the terminals mounted at the ends of the wires are inserted into the rear holder from the rear side of the rear holder in the same direction as the mounting direction of the rear holder, the terminals abut on the tapered surfaces of the rear locking portions. When the terminals are further inserted in the same direction, the flexible pieces are bent by component force of force received from the terminals abutting on the tapered surfaces in a direction in which the rear locking portions are withdrawn from the terminals. By so doing, the flexible pieces are bent, so that the terminals inserted into the rear holder easily climb over the rear locking portions of the flexible pieces and thus holding to the terminal holding parts is smoothly performed.

According to the connector of the present invention, it is possible to improve assembling workability and suppress assembling failure.

So far, the present invention has been briefly described. Moreover, a mode (hereinafter, referred to as an "embodiment") for carrying out the invention to be described below is read through with reference to the accompanying drawings, so that details of the present invention will be further clarified.

DETAILED DESCRIPTION OF EMBODIMENTS

Hereinafter, an embodiment according to the present invention will be described with reference to the drawings.

Figure 1:
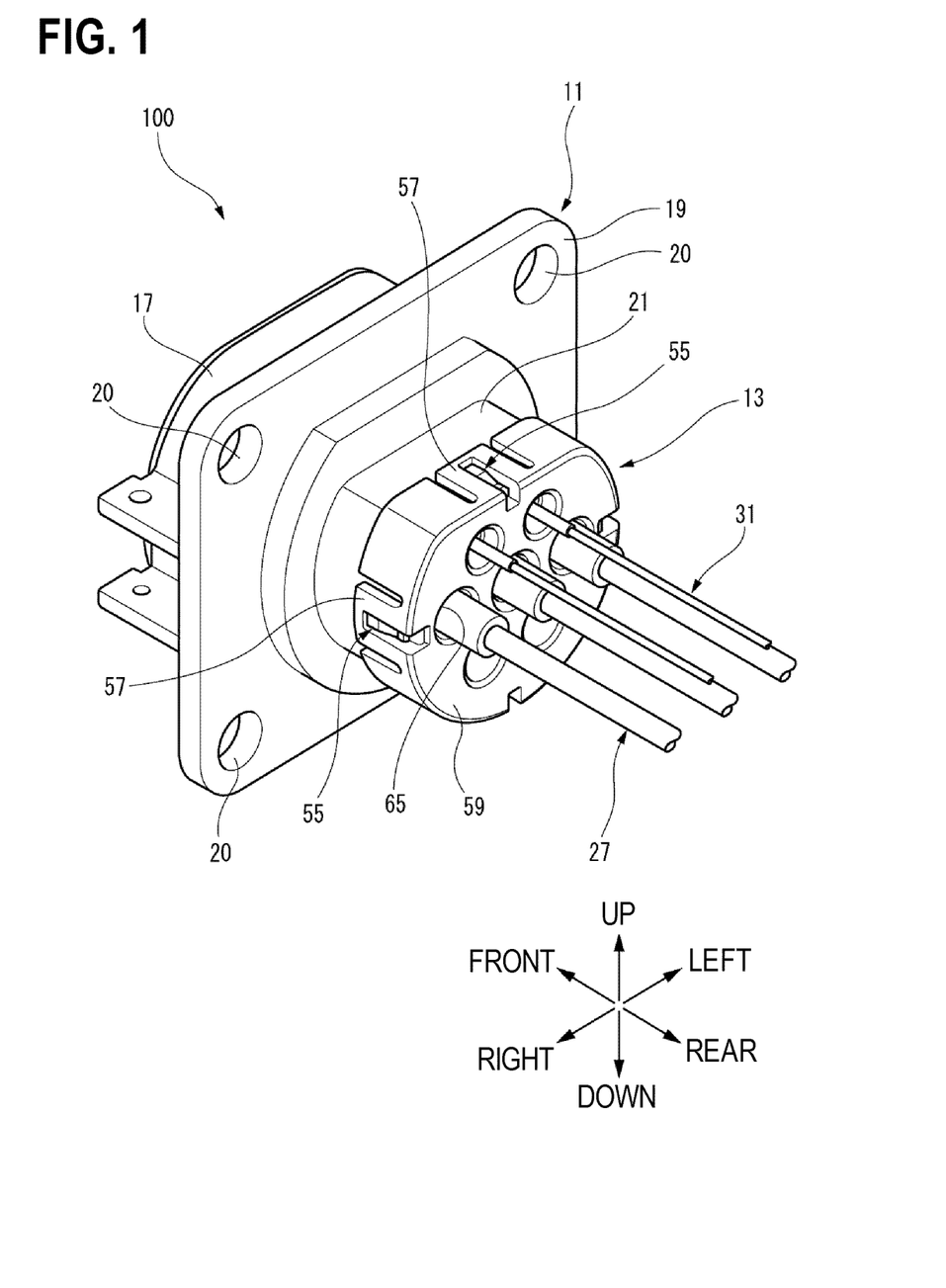
FIG. 1 is a perspective view from a rear end surface side of a connector according to one embodiment of the present invention.

FIG. 1 is a perspective view of a connector according to one embodiment of the present invention.

A charge connector 100 according to the present embodiment, for example, can be preferably used for a power receiving-side connector installed at a vehicle. Of course, the connector according to the present embodiment may also be used as a power feeding-side connector installed at a vehicle. Hereinafter, in the present embodiment, the charge connector 100 will be described. The charge connector 100 includes a housing 11 having a plurality of terminal receiving chambers 23 and a rear holder 13 having a terminal holding part 15 as main elements.

In the present embodiment, the up, down, front, rear, right, and left directions follow the arrow directions illustrated in FIG. 1.

Figure 2:
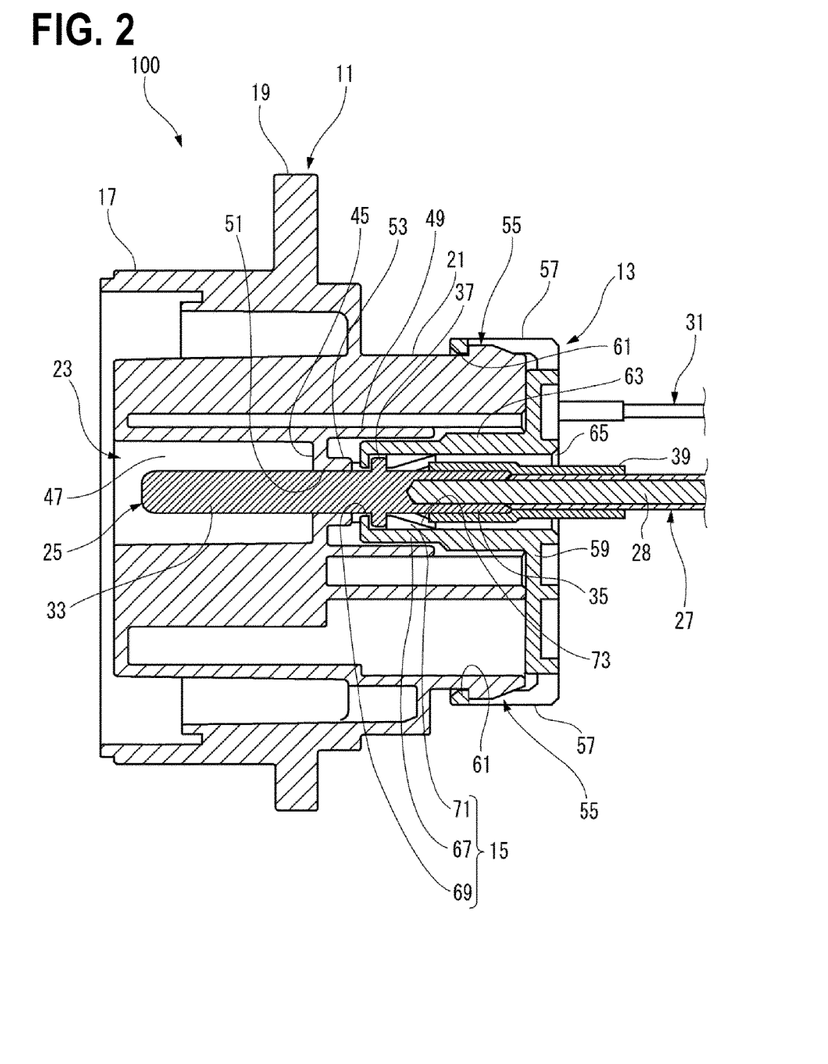
FIG. 2 is a longitudinal sectional view of the connector illustrated in FIG. 1.

As illustrated in FIGS. 1 and 2, the housing 11 is an insulating resin housing having a connector fitting part 17, a mounting flange part 19 protruding sideward from the connector fitting part 17, and an inner cylindrical part 21 protruding from the mounting flange part 19 to a side opposite to the connector fitting part 17. At a front end surface of the connector fitting part 17, distal end sides of the plurality of terminal receiving chambers 23 are opened, and counterpart female terminals of a counterpart connector (not illustrated) are inserted from the openings. A distal end surface of the connector fitting part 17 is opened and closed by a lid (not illustrated). The charge connector 100 is bolt-fixed to a vehicle body side by using mounting holes 20 of the mounting flange part 19. At a rear end surface of the inner cylindrical part 21, each terminal receiving chamber 23 is opened. Wires 27 for power supply and grounding, which are connected to each terminal 25, and wires 31 for signals, which are connected to a terminal 29, are drawn out into the vehicle body from these openings.

The plurality of terminals 25 and 29 are inserted into the respective terminal receiving chambers 23 via the rear holder 13. The plurality of terminals 25 include, for example, two terminals for power supply and one terminal for grounding. Two terminals 29 are terminals for vehicle body side-signals. The terminals 29 for vehicle body side-signals are terminal fittings connected to terminals for device-side signals stored and held in a power feeding-side connector (not illustrated). The wires 31 for signals connected to a power feeding part to an in-vehicle battery are connected to proximal ends of the terminals 29 for vehicle body side-signals. The terminals 29 for vehicle body side-signals have sizes smaller than those of the terminals 25 for power supply and have an approximately similar shape. Accordingly, the terminals 29 for vehicle body side-signals are retained to the housing 11 by a holding structure approximately similar to that of the terminals 25 for power supply. Therefore, in the present specification, the holding structure of the terminals 25 for power supply will be described as an example and the holding structure of the terminals 29 for vehicle body side-signals will not be described.

The terminal 25 is formed in an approximately columnar shape by cutting a conductive metal. In addition, the terminal may also be formed by bending a conductive metal plate material having a predetermined shape by press working. The terminal 25 includes a counterpart terminal contact part 33 with which a counterpart female terminal (not illustrated) contacts, a wire connection part 35 connected to the wire 27, a flange part 37 provided between the counterpart terminal contact part 33 and the wire connection part 35 and protruding in a circular flanged shape.

The flange part 37 serves as a locking part at which the terminal 25 is retained from the housing 11. The counterpart terminal contact part 33 is formed in a circular rod shape. That is, the terminal 25 serves as a male terminal. The wire connection part 35 is crimped and connected to a conductor 28 of the wire 27. Moreover, waterproofing is performed between the wire connection part 35 and the wire 27 by covering an outer peripheral surface with a heat shrink tube 39.

As illustrated in FIG. 2, in the housing 11, the plurality of terminal receiving clambers 23 are formed to receive the respective terminals 25 and 29. An approximate center part of each terminal receiving chamber 23 in a terminal insertion direction is partitioned by a partition wall 45. In the terminal receiving chamber 23, a front side about the partition wall 45 serves as a counterpart female terminal receiving part 47 and a rear side about the partition wall 45 serves as a rear holder entering part 49. In the partition wall 45, a contact part insertion hole 51 is bored. Into the contact part insertion hole 51, the counterpart terminal contact part 33 positioned in front of the flange part 37 is inserted. The counterpart terminal contact part 33 is inserted through the contact part insertion hole 51, and thus is protrudingly arranged in the counterpart female terminal receiving part 47.

In the contact part insertion hole 51 of the partition wall 45, a peripheral wall part 53 is coaxially formed to protrude rearward along the rear holder entering part 49. In the peripheral wall part 53, a protruding distal end surface is arranged facing the flange part 37 of the terminal 25 with a slight gap therebetween.

From the outer periphery of the inner cylindrical part 21, a plurality of (a pair of upper acid lower/right and left in the present embodiment) holder locking protrusions 55 for locking the rear holder 13 protrude. In the holder locking protrusion 55, its rear end side serves as a guide inclination surface and its distal end side serves as a locking vertical surface.

The rear holder 13 supports the wires 27 and 31 connected to the terminals 25 and 29 received in the terminal receiving chambers 23. The rear holder 13 is mounted at the rear end surface of the inner cylindrical part 21 in the housing 11. The rear holder 13 has a plurality of (a pair of upper and lower/right and left in the present embodiment) holder locking arms 57 which are mounted at the housing 11. In the holder locking are 57, its proximal end is supported to a rear holder body 59 and its insertion distal end serves as a free end. The holder locking arm 57 is provided at the distal end thereof with a locking part 61. The locking part 61 is locked to the holder locking protrusion 55 of the housing 11. The locking part 61 is locked to a locking vertical surface of the holder locking protrusion 55, so that the holder locking arm 57 restrains the rearward movement of the rear holder 13 to prevent detachment of the rear holder 13, thereby fixing the rear holder 13 to the rear end surface of the inner cylindrical part 21.

Moreover, the rear holder 13 has a terminal receiving cylindrical part 63. In the terminal receiving cylindrical part 63, terminal insertion holder openings 65 are opened to the rear end surface of the rear holder 13 to enable the insertion of the terminals 25 and 29 from a rear side. Into the terminal insertion holder openings 65 of the terminal receiving cylindrical part 63, the terminals 25 and 29 with the connected wires 27 and 31 are inserted using the counterpart terminal contact part 33 as a distal end side. At the distal end of the terminal receiving cylindrical part 63, the terminal holding part 15 is continuously and integrally provided in a coaxial manner. In the present embodiment, the terminal holding part 15 is integrally formed with the terminal receiving cylindrical part 63.

Figure 3:
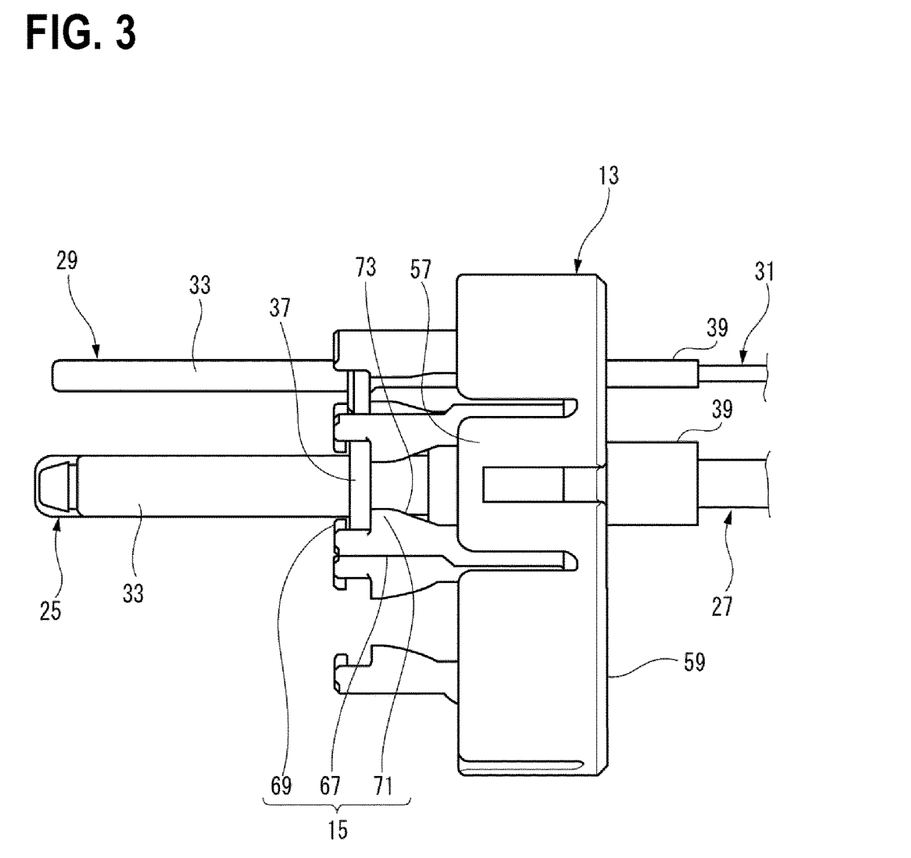
FIG. 3 is a side view of a rear holder mounted with a terminal.

As illustrated in FIG. 3, the terminal holding part 15 of the rear holder 13 holds the respective terminals 25 and 29 to predetermined positions of an insertion direction for each terminal receiving chamber 23. The terminal holding part 15 has a plurality of flexible pieces 67 inserted and fitted to the terminal receiving chamber 23. The flexible pieces 67 can be formed by dividing, for example, a cylindrical part, which coaxially extends from the terminal receiving cylindrical part 63, into a plural number in a circumferential direction by a plurality of cuts following an axis. In the present embodiment, a pair of upper and lower flexible pieces 67 are formed.

The terminal holding part 15 can be configured by about 2 to 4 flexible pieces according to a diameter of a terminal to be held.

A pair of flexible pieces 67 are provided on the inner opposed surfaces of distal end portions thereof with a pair of front locking portions 69. The front locking portions 69 are engaged with the front surfaces of the flange parts 37 of the terminals 25 and 29 to restrain terminal insertion direction positions of the terminals 25 and 29. In the front locking portion 69, an inward protrusion vertically provided toward the opposed flexible piece 67 has a front coming-out restraining surface abutting on the front surface of the flange part 37.

The pair of flexible pieces 67 are provided on the base side thereof from the front locking portions 69 with rear locking portions 71. The rear locking portion 71 locks the terminal 25 to restrain back coming-out of the terminal 25 with respect to the rear holder 13. In the rear locking portion 71, an inward protrusion vertically provided toward the opposed flexible piece 67 has a back coming-out restraining surface abutting on the rear surface of the flange part 37.

Furthermore, in the rear locking portion 71, a tapered surface 73 inclined toward the inner surface of the flexible piece 67 is formed at the rear side of the rear holder. The tapered surface 73 serves as a slope in a direction gradually approaching the center lines of the terminals 25 and 29 toward the terminal insertion direction. When the terminals 25 and 29 are respectively inserted between the pair of flexible pieces 67 in the terminal holding part 15, an outer diameter side of the flange part 37 presses the tapered surface 73, so that the pair of flexible pieces 67 are expanded to open. When the flange part 37 passes through the rear locking portion 71, the pair of flexible pieces 67 return to the original position by elastic restoring force, and the back coming-out restraining surface locks the rear surface of the flange part 37. By so doing, the terminals 25 and 29 are restrained from coming out backward.

As illustrated in FIG. 2, when the rear holder 13 is mounted at the housing 11, the outer diameter sides of the pair of flexible pieces 67 are inserted to inner diameter sides of the rear holder entering parts 49 of the housing 11. Accordingly, the terminal holding part 15 enters into the rear holder entering part 49, so that the expansion and opening of the pair of flexible pieces 67 are restrained. By so doing, the terminal holding part 15 is configured such that displacement of the front locking portion 69 and the rear locking portion 71 is prevented in a direction of separating from the flange part 37 and the locking mechanism is not bent.

Next, an assembling procedure of the charge connector 100 having the aforementioned configuration will be described.

Figure 4:
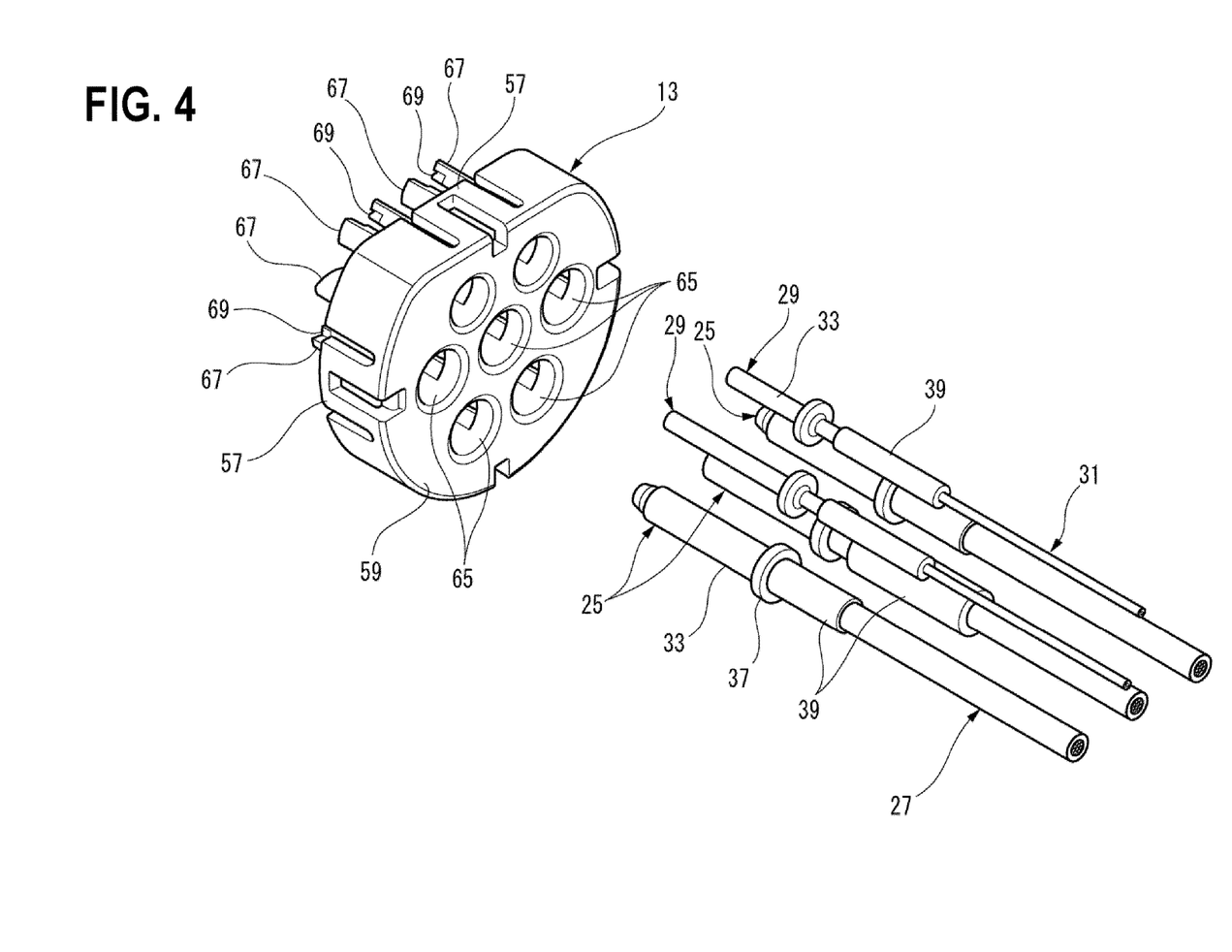
FIG. 4 is a perspective view from a rear end surface side of the rear holder before the terminal is mounted.

As illustrated FIG. 4, in order to assemble the charge connector 100, the terminals 25 and 29 are first inserted into the terminal insertion holder openings 65 of the rear holder 13 from a rear side, respectively. When the flange parts 37 enter into the terminal holding parts 15 from the terminal receiving cylindrical parts 63, the terminals 25 and 29 inserted into the terminal insertion holder openings 65 press the rear locking portions 71 of the flexible pieces 67 in the insertion direction. The tapered surfaces 73 of the rear locking portions 71 are pressed to the flange parts 37, so that the pair of flexible pieces 67 are expanded to open. By so doing, the flange parts 37 pass through the rear locking portions 71. In the terminal holding parts 15, when the flange parts 37 pass through the rear locking portions 71, the flexible pieces 67 are elastically returned and the front surfaces of the flange parts 37 abut on the front locking portions 69 and simultaneously the rear locking portions 71 lock the rear surfaces of the flange parts 37.

Figure 5:
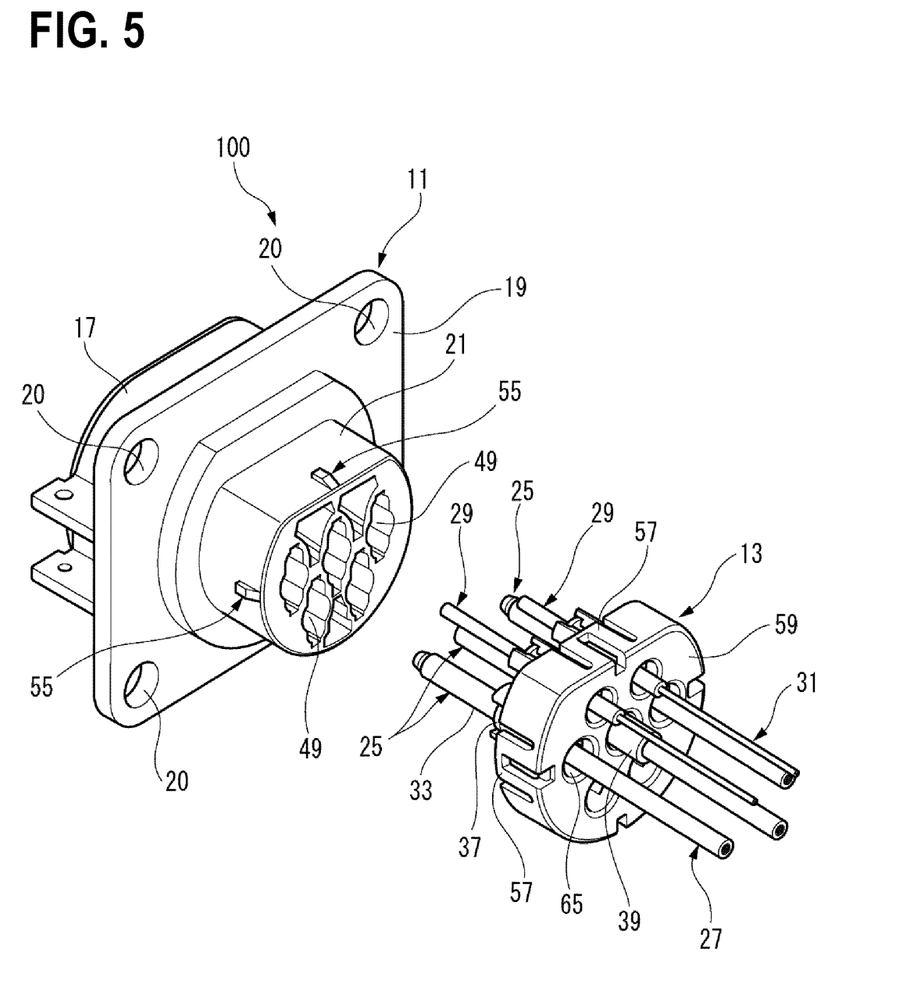
FIG. 5 is a perspective view from a rear end surface side of a housing before the rear holder mounted with the terminal is mounted.

As illustrated in FIG. 5, the rear holder 13 holding the terminals 25 and 29 by all the terminal holding parts 15 is mounted at the inner cylindrical part 21 of the housing 11. The respective terminals 25 and 29 protruding from the distal end side of the rear holder 13 are inserted into the rear holder entering parts 49 of the terminal receiving chambers 23 opened at the rear end surface of the inner cylindrical part 21. In this state, when the rear holder 13 is pushed into the housing 11, the outer diameter sides of the terminal holding parts 15 are inserted into the inner diameter sides of the rear holder entering parts 49 of the terminal receiving chambers 23. Moreover, when the rear holder 13 is further pushed, since the holder locking arms 57 of the rear holder 13 are locked to the holder locking protrusions 55 of the housing 11, the rear holder 13 is restrained from being separated from the housing 11, so that the rear holder 13 is held to the housing 11. By so doing, the assembling of the charge connector 100 is completed.

Next, operations of the configurations in the aforementioned charge connector 100 will be described.

As illustrated in FIGS. 3 and 5, in the charge connector 100 according to the present embodiment, before the rear holder 13 is mounted at the housing 11, the terminals 25 and 29 can be assembled to the terminal holding parts 15 of the rear holder 13. By so doing, in the state in which the terminal holding parts 15 hold the terminals 25 and 29, the rear holder 13 can be mounted at the housing 11, so that assembling workability is improved. Furthermore, the holding state (abnormality and the like of terminal half-insertion and the like) of the terminals 25 and 29 with respect to the terminal holding parts 15 is visible, so that assembling failure is easily suppressed.

Furthermore, in the charge connector 100 of the present embodiment, the terminal holding part 15 of the rear holder 13 is configured by the flexible piece 67 provided at the distal end side thereof with the front locking portion 69 and the rear locking portion 71. The front locking portion 69 locks the front surfaces of the flange parts 37 to restrain the terminal insertion direction positions of the terminals 25 and 29. The rear locking portion 71 is engaged with the rear surfaces of the flange parts 37 to restrain the terminals 25 and 29 from coming out from the rear side of the rear holder 13. The terminals 25 and 29 mounted at the ends of the wires 27 and 31 are inserted into the rear holder 13 in the same direction as the mounting direction of the rear holder 13. The flexible pieces 67 in the terminal holding parts 15 are bent, so that the terminals 25 and 29 inserted into the rear holder 13 climb over the rear locking portions 71 of the flexible pieces 67, and then their terminal insertion direction positions are restrained by the front locking portions 69 and thus the terminals 25 and 29 are stopped. The terminal insertion direction positions of the terminals 25 and 29 are decided by the front locking portions 69 and simultaneously the flexible pieces 67 are elastically returned, so that coming-out from the rear side of the rear holder 13 is restrained by the rear locking portions 71. That is, the terminals 25 and 29 are mounted in the rear holder 13 to be prevented from being separated in the front and rear direction.

The rear holder 13 mounted with the terminals 25 and 29 is mounted at the housing 11. Accordingly, the terminals 25 and 29 are assembled to the housing 11 via the rear holder 13. Accordingly, the charge connector 100 of the present embodiment does not need a difficult work such as pushing-aside of the wire 27 as the connector 500 of the related art illustrated in FIG. 6.

Furthermore, in the charge connector 100 of the present embodiment, the terminal holding parts 15 can be easily and integrally formed with the rear holder 13 by the flexible piece 67 having the front locking portion 69 and the rear locking portion 71.

In the charge connector 100 of the present embodiment, when the terminals 25 and 29 mounted at the ends of the wires 27 and 31 are inserted into the rear holder entering parts 49 of the rear holder 13 from the rear side of the rear holder 13 in the same direction as the mounting direction of the rear holder 13, the terminals 25 and 29 abut on the tapered surfaces 73 of the rear locking portions 71. When the terminals 25 and 29 are further inserted in the smile direction, the flexible pieces 67 are bent by component force of force received from the terminals 25 and 29 abutting the tapered surfaces 73 in a direction in which the rear locking portions 71 are withdrawn from the terminals 25 and 29. By so doing, the flexible pieces 67 are bent, so that the terminals 25 and 29 inserted into the rear holder 13 easily climb over the rear locking portions 71 of the flexible pieces 67 and thus holding to the terminal holding parts 15 is smoothly performed.

Consequently, according to the charge connector 100 of the present embodiment, it is possible to improve assembling workability and suppress assembling failure.

It is noted that the present invention is not limited to the aforementioned embodiment, modifications and applications by a person skilled in the art are predicted in the present invention on the basis of combinations of the elements of the embodiment, description of the specification, and the well-known technology, and are included in the protection range thereof.

For example, in the aforementioned embodiment, the case in which the terminal holding part 15 is configured by the flexible piece 67 has been described as an example; however, the terminal holding part may have rigidity and retain a terminal without being bent. In this case, the terminal is not a cut part having the flange part 37 as the terminals 25 and 29, and for example, a locking part, which is bent by press working, is cut and raised, and has flexibility, is locked to the terminal holding part having rigidity. In this example, when the terminal is inserted, the locking part of the terminal is deformed to climb over the rear locking portion of the terminal holding part differently from the aforementioned embodiment. According to this example, the rigidity of the rear locking portion for restraining the terminal from coming out backward can be enhanced, so that it is possible to achieve high resistance to coming-out backward of the terminal holding part and thus to hold the terminal with high reliability.

Furthermore, in the aforementioned embodiment, the configuration, in which the terminals 25 and 29 are inserted into the rear holder entering parts 49 of the rear holder 13 from the rear side to be held by the terminal holding part 15, has been described as an example; however, the terminal holding part of the present invention is not limited thereto and it may employ a configuration in which a slit (see the slit 509 of FIG. 6) similar to the relate art is opened at the side surface of the rear holder and a terminal holding part holds a terminal inserted from the side of the rear holder.

Hereinafter, the characteristics of the embodiment of the connector according to the aforementioned present invention will be briefly summarized in [1] to [3].

[1] A connector (a charge connector 100) including a housing (11) having a plurality of terminal receiving chambers (23) into which terminals (25 and 29) are inserted, and a rear holder (13) mounted at the aforementioned housing and supporting a wire (27) connected to the aforementioned terminal received in the aforementioned each terminal receiving chamber, wherein the aforementioned rear holder has a terminal holding part (15) that holds the aforementioned each terminal at a predetermined position of an insertion direction for the aforementioned each terminal receiving chamber.

[2] The connector (the charge connector 100) of the aforementioned [1], wherein the aforementioned terminal holding part includes a plurality of flexible pieces (67)

inserted and fitted to the aforementioned terminal receiving chambers, front locking portions (69) formed at distal end portions of the aforementioned flexible pieces and engaged with the aforementioned terminals to restrain terminal insertion direction portions of the aforementioned terminals, and rear locking portions (71) formed at base sides of the aforementioned flexible pieces from the aforementioned front locking portions and engaged with the aforementioned terminals to retain and lock the aforementioned terminals with respect to the aforementioned rear holder.

[3] The connector (the charge connector 100) of the aforementioned [2], wherein, at a rear holder rear side of the aforementioned rear locking portion, a tapered surface (73) inclined toward an inner surface of the aforementioned flexible piece is formed.

What is claimed is:

1. A connector comprising:
    a housing that has a plurality of terminal receiving chambers into which terminals are inserted; and
    a rear holder that is mounted at the housing and supports wires respectively connected to each terminal of the terminals received in the plurality of terminal receiving chambers,
    wherein the rear holder has a terminal holding part that holds each terminal of the terminals at a predetermined position in an insertion direction of the rear holder into the plurality of terminal receiving chambers such that the terminal holding part prevents each terminal of the terminals from moving, relative to the rear holder, in the insertion direction and in a direction opposite to the insertion direction, and
    wherein the terminal holding part includes:
        a plurality of flexible pieces which are inserted and fitted to the plurality of terminal receiving chambers;
        front locking portions which are each connected to a distal end portion of a respective flexible piece of the plurality of flexible pieces and engaged with a respective terminal of the terminals to restrain the terminals in a terminal insertion direction; and
        rear locking portions which are each connected to a base side of a respective flexible piece of the plurality of flexible pieces compared to the front locking portions and each engaged with a respective terminal of the terminals to retain and lock the terminals with respect to the rear holder.

2. The connector according to claim 1, wherein
    the rear locking portions are each formed with a tapered surface inclined toward an inner surface of the respective flexible piece to which the rear locking portions are connected, at a rear side of the rear holder.

3. The connector according to claim 1, wherein
    the rear holder is configured to hold the terminals with the terminal holding part by receiving the terminals at a rear side of the rear holder that is opposite to the insertion direction of the rear holder.

4. The connector according to claim 1, wherein
    the rear locking portions and the front locking portions are formed to extend inwards from the plurality flexible pieces.

* * * * *